July 6, 1937.  M. L. FORREST  2,085,965
CLUTCH
Filed June 23, 1936
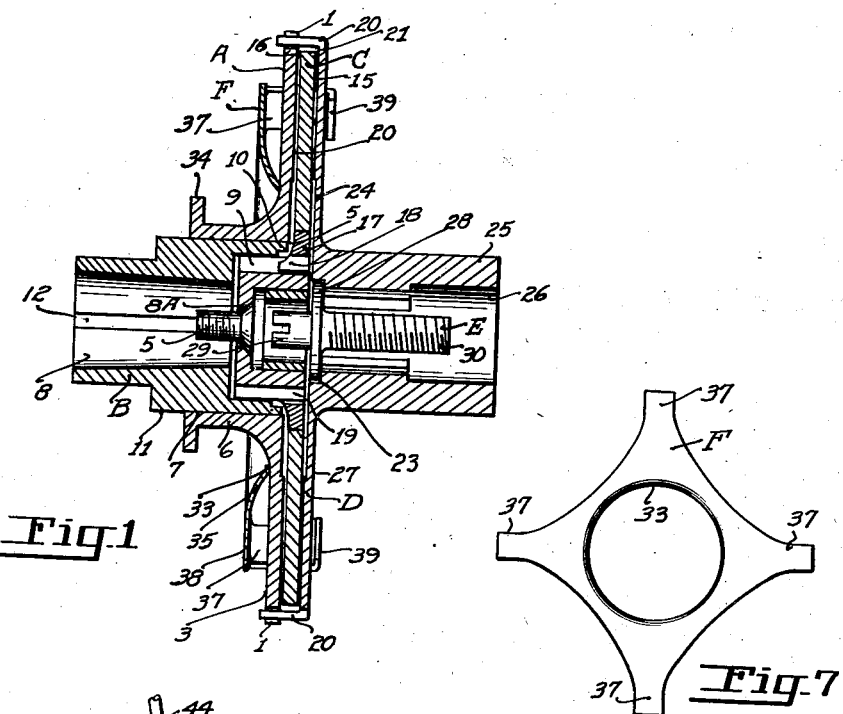
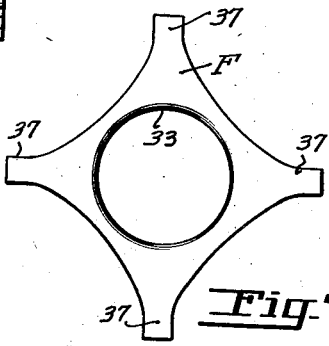
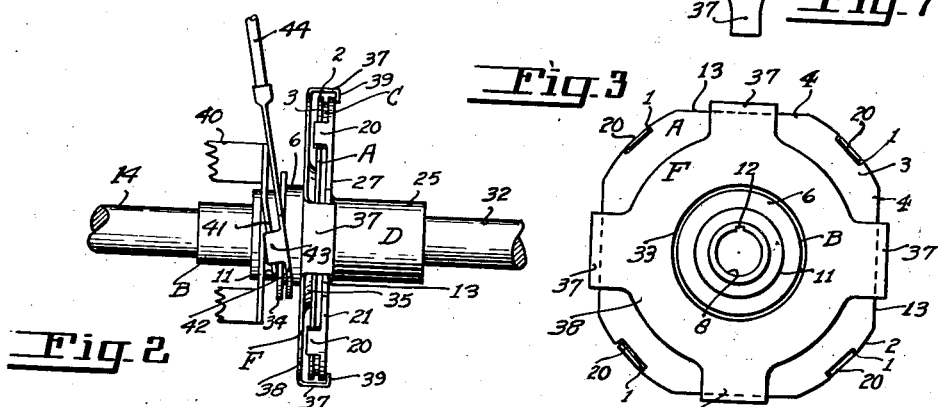
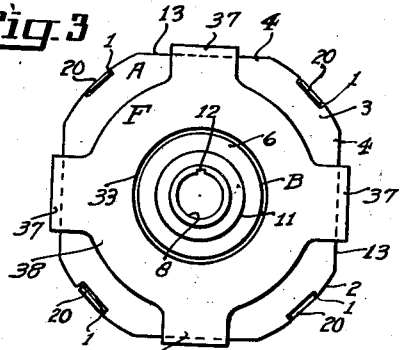
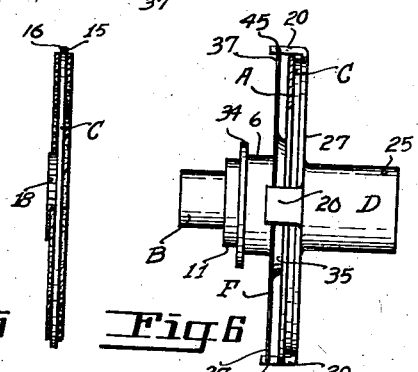
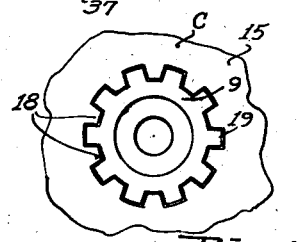
INVENTOR
MARK L. FORREST
BY
*Samuel S. Jacobson*
ATTORNEY Patented July 6, 1937

2,085,965

UNITED STATES PATENT OFFICE 2,085,965

CLUTCH

Mark L. Forrest, Missoula, Mont.

Application June 23, 1936, Serial No. 86,794

7 Claims. (Cl. 192—68)

This invention relates generally to clutches, but is specifically directed to the friction type of clutch, adaptable for use with power driven saws; and has as its main object the combination of elements into a compact, simple and durable clutch possessing as one of its important elements a member which is shaped to induce and maintain a compressive influence upon the friction plate of said clutch, so that, under normal operating conditions, it is pressed and retained in working relation with the face plates surrounding the friction plate, but which may be released from such working relation by a slight decrease in the compression induced by said resilient member.

The quintessence of my invention is to provide a friction clutch, which is compact, durable, light in weight, small in size and capable of being used with any type of portable machine requiring a clutch, such as power driven saws or other devices, where compactness and portability are important, if not essential factors to take into consideration.

Briefly stated, the invention contemplates the embodiment in a clutch of two face plates interlocked with respect to each other so that one may receive its rotational movement from the other; a driven friction plate, fiber faced or otherwise, possessing characteristics which permit it to move longitudinally notwithstanding the fact that it, also, rotates and imparts rotation to the face plates when they are compressed against the friction plate; a threaded member adapted to align and hold the clutch in place; a coupling member meshed with respect to the friction plate and engaged for rotational movement to the drive shaft of any machine with which the clutch is used; a resilient member compressed against one of the face plates and secured to the other of the face plates, to thereby retain said face plates in locked relation with each other and to induce a compression against said plates of sufficient moment to effectively hold said plates firmly in frictional engagement against said driven friction plate, to thereby force said friction plate to drive said face plates and means for decreasing the constraining influence of the resilient member against said face plates in order to release the pressure on the friction plate, when it is desired to halt the rotation of said face plates.

An important object of the invention is to provide a resilient member which locks and holds the face plates together and at the same time provides sufficient pressure on the friction plate to impart rotational movement to the face plates, when the friction plate is rotated.

Another object of the invention is to provide a clutch which possesses few parts requiring relatively little adjustment and which is capable of being easily and quickly repaired and assembled for service as occasion may require.

As the following detailed description unfolds itself, other objects and advantages inherent in my invention will become apparent, especially when examined and read in conjunction with the accompanying drawing which forms a part of this specification and which illustrates, by way of example only, one way by which my invention may be practiced, and in which:

Figure 1 is a sectional, side view of a clutch embodying the principles of my invention.

Figure 2 is a side elevation of the clutch embodying the principles of my invention showing one way of releasing the pressure from the friction plate.

Figure 3 is an end view of the clutch shown in Figures 1 and 2 and illustrating the position of the resilient member with respect to the other elements of the clutch.

Figure 4 is a fragmentary, end view of the friction plate, showing the operative connection between the friction plate and the member which is joined to the motor shaft.

Figure 5 is a side view, partially in section, of a friction plate embodying the principles of my invention having friction lining secured on its surfaces.

Figure 6 is a side elevation of a clutch embodying the principles of my invention, graphically illustrating a modified form of construction of the resilient member and its engagement with the clutch.

Figure 7 is an end view of a modified form of construction embodied in the resilient member used in the construction illustrated in Figure 6.

Corresponding and like parts are referred to in the following description and designated in the several views of the drawing by like reference characters:

The clutch is provided with a circular face plate, generally designated by reference character A, which has a plurality of equally spaced cut out portions 1 formed within its periphery 2. The outer surface 3 of face plate A may have spaced substantially flat surfaces, as shown at 4, disposed between the cut out portions 1, in order to accommodate the contour of the prongs formed within the resilient member hereafter to be more specifically described. A flanged hub 6, having an opening 7 therethrough, is joined to and extends outwardly from the outer surface 3 of face plate A. This flanged hub 6 serves to effect the release of the clutch and may be made integral with the face plate A, or may be removably secured thereto in any well known manner.

A coupling member, designated generally by reference character B, which, itself, possesses an opening 8, is movably disposed within opening 7 of flanged hub 6. This coupling member B acts as a journal for said flanged hub 6. Coupling member B has a spline member 9 secured thereto and extending outwardly from end 10 thereof. The coupling member B is positioned within the opening 7, so that its cylindrical surface 11 forms a riding surface about which the flanged hub 6 may freely move. The coupling member B has a key way 12 therein which permits the end of the drive shaft 14, of any machine with which the clutch may be associated, to be keyed thereto, so that rotation may be imparted to the coupling member B, when the shaft 14 is rotated. An opening 8A is, also, provided through splined member 9, and a threaded member 5 is disposed therein. This threaded member 5 engages with the end of shaft 14, thus providing a tight connection between coupling member B and shaft 14. While the splined member 9 is securely pressed into coupling member B, the threaded member 5, when secured to shaft 14, provides added assurance against the movement of the splined member 9 with respect to the coupling member B.

The clutch, also, possesses a friction plate, designated generally by reference character C, which may have its faces 15 and 16 fiber faced, as shown in Figure 5, or may possess some other element on its faces to create a frictional resistance. This friction plate C may be made of any material, but preference is given to copper. When copper is used, a hardened steel collar 17 is fixedly secured within its center. A plurality of teeth 18 extend inwardly from the collar and on the face 16. These teeth mesh with the teeth 19 of splined member 9. It immediately becomes apparent that, when the teeth 18 are meshed with the teeth 19, rotation is imparted to the friction plate C, when the coupling member B is rotated by shaft 14. This construction, also, permits the longitudinal play of the friction plate C, which is necessary in order to provide for the positive release of the clutch. Face 16 of friction plate C normally contacts inner surface 20 of face plate A and imparts rotation to face plate A, when they are pressed sufficiently together to prevent slippage.

A second circular face plate, generally designated by reference character D, has a plurality of equally spaced lugs 20 extending outwardly in the same direction from the periphery 21. These lugs are positioned about periphery 21, so that they are in registerable alignment with and fit into the cut out portions 1 formed in face plate A. In this manner, the face plates A and D are joined for simultaneous rotation. The periphery 21 may have equally spaced flat surfaces, as shown at 13, disposed between the lugs 20 and so positioned as to coincide with the flat surfaces 4 of face plate A in order to accommodate the contour of the prongs formed in the resilient member not yet described. A splined hub 25, having opening 26 therethrough, extends outwardly from outer surface 27 of the face plate D. This hub 25 may be made integral with or may be removably secured to the face plate D in any desirable manner. Face 15 of friction plate C normally contacts the inner surface 24 of face plate D and imparts rotation to face plate D, when sufficient pressure is exerted against the friction plate C. An annular recess 23 is formed within the inner surface 24 of face plate D and is in alignment with opening 26.

A threaded member, designated generally by reference character E, has a collar 28, which fits snugly into the annular recess 23, so that there is no protruding surface which interferes with the smooth inner surface 24 of the face plate D. The slotted end 29 permits the threaded end 30, which extends into opening 26, to be threadably engaged into the shaft 32. Shaft 32 is removably secured in operative connection to face plate D by splined hub 25 which is locked to the shaft by its spline. The threaded member E prevents the face plate D from being disengaged from the shaft 32.

Retention of the face plates and friction plate in intimate and working contact is accomplished by a resilient member, designated generally by reference character F, which is made of spring steel or other metal having the same characteristics. An opening 33 is disposed centrally of the resilient member F, said opening being of sufficient size to permit the resilient member F to pass over the collar 34 of release flanged hub 6. The area adjacent the opening 33 is slightly inclined, thus providing an annular projection 35 on the inner face of the resilient member F. This projection 35 contacts the outer surface 3 of face plate A. A plurality of arms 37 extend radially from the body portion 38 of the resilient member F. Each of these arms 37 has a locking prong 39 which is shaped to engage the surface 27 of the face plate D to thereby lock and hold this face plate against friction plate C. The projection 35 contacting the outer surface 3 of face plate A and the prongs 39 engaging with the outer surface 27 of face plate D, create a compressive force which causes these face plates to be held under pressure against the faces 15 and 16 of the friction plate C. While this construction permits a considerable load to be carried by the clutch, it provides a positive assurance against overloading because the friction plate will slip notwithstanding the pressure of the resilient member F, if too great a load is forced upon the machine to which the clutch is attached.

Any clutch release mechanism may be used in releasing the pressure against face plates A and D induced by resilient member F, but there is shown, by way of example, in Figure 2, a clutch release mechanism satisfactorily adaptable for the type of clutch illustrated therein. A support member 40, which is secured to any machine with which the clutch is associated, has a pair of inclined fingers 41. A clutch release collar 42 is disposed about flanged hub 6 and is adapted to engage the collar 34. A pair of hooks 43 extend from release collar 42 and are adapted to slidably engage with inclined fingers 41. A handle 44 is joined to the release collar 42. By an upward pull upon handle 44, the hooks of the release collar 42 will slidably move about the inclined fingers 41; and, since the release collar 42 contacts collar 34 of flanged hub 6, the face plate A will be moved laterally against the compressive force of the resilient member F. In this manner, pressure is removed from the friction plate C, thus permitting it to rotate freely as shaft 14 is rotated.

In Figures 6 and 7, there is shown a slightly modified construction of the invention. In those figures, there is shown a resilient member F, the arms 37 of which do not possess prongs, but instead are inserted in grooves 45, formed in lugs 20.

This construction, also, lends itself to an additional modification. By removing hub 25, it is possible to join face plate D in any desirable manner to the fly wheel of a motor with which the clutch may be associated. This construction provides a clutch possessing the general characteristics of the invention, but capable of use with larger power units for heavier duty.

This completes the detailed description of the invention and, from the foregoing description, it will be seen that I have produced a clutch, which substantially fulfills the objects of the invention set forth herein. While this specification sets forth in detail the present and preferred construction of the invention, still, in practice, such deviations from such detail as come within the skill of the mechanic may be resorted to, but which do not depart from the spirit of the invention. It should, therefore, be understood that I consider as my own all such modifications and adaptations of the invention, as defined in the appended claims.

Having thus described my invention what I claim as new and useful and upon which I desire to secure Letters Patent, is:

1. The combination with a clutch having, a pair of face plates, one of said face plates having equally spaced cut-out portions formed within its periphery, a plurality of equally spaced lugs extending from the periphery of the other of the face plates, said lugs being in registerable alignment and engaging with said cut-out portions, to thereby join said face plates together, a friction plate disposed between said face plates, and means passing through one of the face plates and engaging the friction plate, whereby rotation is imparted to said friction plate, of a resilient member disposed under tension against one face plate and locked against the other face plate, said resilient member adapted to compress said face plates against said friction plate in order that said face plates may receive rotation from said friction plate, said resilient member having a plurality of fingers extending radially from its periphery, and a locking prong disposed at the end of each finger.

2. The combination with a clutch having, a pair of face plates, one of said face plates having equally spaced cut-out portions formed within its periphery, a plurality of equally spaced lugs extending from the periphery of the other of the face plates, said lugs being in registerable alignment and engaging with said portions, to thereby join said face plates together, a friction plate disposed between said face plates, a toothed collar formed within said friction plate, and a splined member passing through one of the face plates and engaging the toothed collar of the friction plate, whereby rotation is imparted to said friction plate, of a resilient member disposed under tension against one face plate and locked against the other face plate, said resilient member adapted to compress said face plates against said friction plate in order that said face plates may receive rotation from said friction plate, said resilient member having a plurality of fingers extending radially from its periphery, and a locking prong disposed at the end of each finger.

3. The combination with a clutch having, a pair of face plates, one of said face plates having a release flange and the other of said face plates having a hub, a friction plate disposed between said face plates, said friction plate having a toothed member centrally thereof, and a splined member movably disposed within the release flange adapted to operatively engage said toothed member, of a resilient member removably disposed against one face plate and locked against the other face plate, whereby said face plates and said friction plate are normally held in operative engagement by pressure induced by said resilient member, said resilient member having a plurality of fingers extending radially from its periphery, and a locking prong disposed at the end of each finger.

4. The combination with a clutch of the class described, comprising, a friction plate possessing a plurality of teeth therein, a pair of face plates disposed adjacent the sides of the friction plate and interlocked against each other, and means associated with the friction plate and adapted for meshing with the teeth within said friction plate, said means adapted for imparting rotation to said friction plate, of resilient means compressively positioned against one face plate and locked against the other face plate, to thereby normally force the face plates and the friction plate into intimate engagement with each other, said resilient means comprising a body member having an opening disposed centrally thereof, a plurality of arms extending radially from said opening, and a prong formed at the end of each of said arms, and means associated with one of the face plates adapted for releasing the compression of the resilient means upon said face plate.

5. The combination with a clutch having a pair of face plates, a friction plate disposed therebetween, and means for driving said friction plate, of a resilient member consisting of a main portion having an opening disposed centrally therethrough, the materials adjacent the circumference of the opening being pressed inwardly to form an annular projection, a plurality of fingers extending radially from said main portion, and a locking prong disposed at the end of each finger adapted to hold the face plates and friction plate under the compressive influence of the resilient member.

6. A resilient member to be used with a clutch of the class described, comprising a main portion having an opening disposed centrally therethrough, the material adjacent the circumference of the opening being pressed inwardly to form an annular projection, a plurality of fingers extending radially from said main portion, and a locking prong disposed at the end of each finger adapted to hold the face plates and friction plate of the clutch under compressive influence of the resilient member.

7. Means to be used in conjunction with a friction clutch of the class described for controlling the rotation of the face plates thereof, comprising, a resilient member having an opening disposed centrally thereof and an annular projection surrounding said opening, a plurality of arms extending radially from said opening and means formed at the end of each of said arms adapted to engage and lock the face plates of the friction clutch and to create a compressive influence upon said face plates by forcing the said annular projection to intimately engage one of said face plates.

MARK L. FORREST.